US006986843B2

(12) United States Patent
Tochikubo et al.

(10) Patent No.: US 6,986,843 B2
(45) Date of Patent: Jan. 17, 2006

(54) WATER PURIFIER

(75) Inventors: Shigeo Tochikubo, Tajimi (JP); Ichiro Tomatsu, Tajimi (JP); Takeshi Kachi, Mizunami (JP); Kazuto Matsue, Ena-gun (JP)

(73) Assignee: TYK Corporation, Tajimi (JP)

( * ) Notice: Subject to any disclaimer, the term of this patent is extended or adjusted under 35 U.S.C. 154(b) by 221 days.

(21) Appl. No.: 10/208,998

(22) Filed: Aug. 1, 2002

(65) Prior Publication Data

US 2003/0034290 A1 Feb. 20, 2003

(30) Foreign Application Priority Data

Aug. 8, 2001 (JP) ............................ 2001-240959
Aug. 8, 2001 (JP) ............................ 2001-240977

(51) Int. Cl.
*B32B 1/10* (2006.01)

(52) U.S. Cl. ...................... 210/287; 210/282; 210/490; 210/506; 210/510.1; 210/315; 210/338; 210/501; 156/89; 502/402; 502/413; 427/244; 264/113; 264/122; 264/DIG. 48

(58) Field of Classification Search ................ 210/287, 210/315, 338, 435, 501, 282, 490, 506, 510.1; 156/89; 264/122, DIG. 48, 113; 502/80, 502/402, 413; 427/244
See application file for complete search history.

(56) References Cited

U.S. PATENT DOCUMENTS 4,518,704 A * 5/1985 Okabayashi et al. .......... 502/80
4,540,489 A 9/1985 Barnard
4,677,086 A * 6/1987 McCue et al. ................ 502/62
4,753,728 A * 6/1988 VanderBilt et al. ......... 210/282
4,795,735 A * 1/1989 Liu et al. .................... 502/415
4,857,243 A * 8/1989 Von Blucher et al. ........ 264/13
4,859,386 A * 8/1989 VanderBilt et al. ......... 264/113
4,954,469 A 9/1990 Robinson
5,017,318 A * 5/1991 Vanderbilt et al. .......... 264/113
5,277,802 A 1/1994 Goodwin
5,620,597 A 4/1997 Andelman
5,685,986 A 11/1997 Yamada et al.
5,972,427 A * 10/1999 Muhlfeld et al. ........... 427/244
6,056,275 A 5/2000 Wiederkehr
6,245,701 B1 6/2001 Sato

FOREIGN PATENT DOCUMENTS

EP 0 236 071 9/1987
EP 0 505 125 9/1992
EP 0 616 975 9/1994

* cited by examiner

*Primary Examiner*—Duane Smith
*Assistant Examiner*—Minh-Chau T. Pham
(74) *Attorney, Agent, or Firm*—Oblon, Spivak, McClelland, Maier & Neustadt, P.C.

(57) ABSTRACT

Water purifier includes a container having a room, a filtering material disposed in the room for purifying water for catching particles and fungi such as polio viruses. The filtering material is a sintered activated carbon block filter having pores. The filtering material preferably has a first filtering material and a second filtering material. One thing out of the first filtering material and the second filtering material is formed of a sintered activated carbon block filter whose average pore diameter is relatively small and whose amount of penetrating water is relatively small per unit time. Another thing out of the first filtering material and the second filtering material is formed of a sintered activated carbon block filter whose average pore diameter is relatively large and whose amount of penetrating water is relatively large per unit time.

33 Claims, 9 Drawing Sheets

2W−3 (x1000)

WATER PURIFIER

BACKGROUND OF THE INVENTION

1. Field of the Invention

The present invention relates to a water purifier with an activated carbon filter having a solid block shape. The water purifier concerning the present invention can include water purifiers used for cooking or drinking for ordinary homes, medical offices, restaurants, and the like.

2. Description of the Related Art

Conventionally, in Japan, water purifiers with a filter using granular activated carbon powder have been widely used for removing disinfectant components, trihalomethanes, and the like by adsorption and chemical reaction. There have been used sintered activated carbon block filters formed by combining with aggregate of the activated carbon powder by sintering.

In U.S.A. advancing informational disclosure, some reports disclose that weakened polio virus, namely, vaccine excreted from a living body, sometimes recovers toxicity when it flows in rivers with feces. In Japan, some reports disclose that in addition to the polio virus, a plurality of fungi abundantly increase in digestive organs—these fungi contain six groups of coxsackie virus, ecology virus, infectious hepatitis virus, adenovirus, and reovirus. Moreover, U.S.A. has decided removal of viruses such as polio viruses as a standard of water supply. Poliomyelitis have been sometimes detected in some regions such as Russia, South-East Asia, Africa, and Latin America. So, water purifiers are urgently requested which can effectively remove fungi such as polio viruses, with simplicity, usability, and cheapness.

In U.S.A., there have been popular compressed activated carbon block filters having a hollow cylinder shape, which are formed of the mixture mixing activated carbon powder with thermoplastic resin powder. This purpose is to remove protozoa having a size of several tens μm, bacteria, and the like.

According to the sintered activated carbon block filter of the above mention, the water permeable area is considerably small in comparison with the water purifier using a hollow fiber membrane. So, if the pore is set to be small for improving catching ability of the sintered activated carbon block filter, the amount of penetrating water is lowered per unit time at usual water pressure. So, this activated carbon block filter can not be used as a practical water purifier.

Then, according to the sintered activated carbon block filter, it is requested that the particle size of activated carbon powder is set to be large for increasing the amount of penetrating water per unit time. Such case, however, induces the problem that a catching ability is insufficient though the amount of penetrating water is increased per unit time. That is to say, the sintered activated carbon block filter does not catch: (1) "brevundimonas diminuta" (hereinafter it is also referred to as "brevundimonas") having a diameter of 0.3 μm, being generally used for a bacteria-proof in Japan, and (2) "*escherichia coli*" having a diameter of 0.65 μm.

Further, the sintered activated carbon block filter does not catch: (1) polio virus having a diameter of 25–35 nm; and (2) "bacteriophage MS-2" being used as a substitution for polio viruses. As above mentioned the conventional water purifiers are insufficient in improving catching ability and water permeability.

SUMMARY OF THE INVENTION

The present invention has been accomplished in view of the aforementioned circumstances. It is therefore an object of the present invention to provide a water purifier which can increase catching ability. Further, it is therefore an object of the present invention to provide a water purifier which can increase catching ability, and water permeability.

In a first aspect of the present invention, a water purifier comprises: a container having a room; and a filtering material disposed in the room for purifying water supplied to the room; and wherein the filtering material is formed of a sintered activated carbon block filter having a plurality of pores. Accordingly, in the first aspect of the present invention, ability is ensured for catching fungi and particles.

In a second aspect of the present invention, a water purifier comprises: a container having a room; and a filtering material disposed in the room for purifying water supplied to the room; wherein the filtering material is formed of a sintered activated carbon block filter having a plurality of pores; and wherein the filtering material has a first filtering material and a second filtering material characterized in that:

one thing out of the first filtering material and the second filtering material is formed of a sintered activated carbon block filter whose average pore diameter is relatively small and whose amount of penetrating water is relatively small per unit time; and another thing out of the first filtering material and the second filtering material is formed of a sintered activated carbon block filter whose average pore diameter is relatively large and whose amount of penetrating water is relatively large per unit time. Thus, said one thing is smaller than said another thing in the average pore diameter and in the amount of penetrating water per unit time. The term of "the amount of penetrating water" means the amount of water which can penetrate through the activated carbon block filter, and means water permeability.

In the second aspect of the present invention, said one thing out of the first filtering material and the second filtering material is formed of the sintered activated carbon block filter whose average pore diameter is relatively small and whose amount of penetrating water is relatively small per unit time. Accordingly, ability is ensured for catching fungi including viruses and bacterium,and for catching particles.

Also, in the second aspect of the present invention, said another thing out of the first filtering material and the second filtering material is formed of a sintered activated carbon block filter whose average pore diameter is relatively large and whose amount of penetrating water is relatively large per unit time. Accordingly, the amount of penetrating water is ensured per unit time to improve water permeability. As a result, the water purifier can improve both ability for catching fungi and particles, and water permeability.

Preferable Modes

According to a preferable mode of the present invention, the water purifier can include a water supplying portion for supplying water to a room of a container containing a filtering material, and a water discharging portion for discharging water purified by the filtering material in the room.

According to a preferable mode of the present invention, there can be provided a first filtering material and a second filtering material. The first and second filtering materials can be coaxially placed. One thing out of the first filtering material and the second filtering material can be disposed at an outer circumferential side thereof: another thing out of the first filtering material and the second filtering material can be disposed at an inner circumferential side thereof. For said one thing, the average pore diameter is smaller than that of said another thing. For said one thing, though ability is sufficient for catching fungi and fine particles, pressure loss is large per unit time in supplying water, and water permeability is small. When said one thing is disposed at the outer circumferential side of the filtering material, the area of water-supplying surface of said one thing is advantageously increased, and thereby water permeability is increased, while the catching ability is increased for fungi and fine particles.

Still, as for said one thing whose average pore diameter is relatively smaller, the average pore diameter may be 0.1–0.5 μm, especially 0.2–0.3 μm. Here, the pore diameter is not limited to these ranges. Further, as for said another thing whose average pore diameter is relatively larger, the average pore diameter may be 0.5–3.05 μm, especially 0.5–1.0 μm. Here, the pore diameter is not limited to these ranges.

According to a preferable mode of the present invention, the filtering material can have a cylindrical shape, and it can be provided with an electrode terminal for applying voltage in a radius direction of the filtering material. This case is advantageous in applying voltage the whole filtering material for disinfecting fungi caught in the pore of the filtering material.

According to a preferable mode of the present invention, the first filtering material and the second filtering material can have a cylindrical shape, and the both can be coaxially placed in a unit. In this case, the first filtering material and the second filtering material can be integrally connected with each other. Moreover, the first filtering material and the second filtering material can be coaxially and independently disposed. This case can be obtained by fitting the first filtering material with the second filtering material.

According to a preferable mode of the present invention, the water purifier can include: (1) one electrode selected from a positive electrode and a negative electrode attached directly or indirectly to the filtering material; (2) a first electrode terminal electrically connected with said one electrode; (3) another electrode selected from a positive electrode and negative electrode attached directly or indirectly to the container side; and (4) a second electrode terminal electrically connected with said another electrode. This case is advantageous in applying voltage to the filtering material for electrically disinfecting fungi caught in the pore of the filtering material.

According to a preferable mode of the present invention, the filtering material can have a cylindrical shape with a hole in which a cylindrical member is disposed for forming a way communicated with a water supplying portion or a water discharging member. There can be an electrode terminal electrically connected with at least one selected from a positive electrode and a negative electrode. This case is advantageous in applying voltage to the filtering material for electrically disinfecting fungi caught in the pore of the filtering material.

Sintered Activated Carbon Block Filter

According to a preferable mode of the present invention, there can be provided a sintered activated carbon block filter formed as the first filtering material and the second filtering material constituting the filtering material. The sintered activated carbon block filter (hereinafter it is sometimes referred to as block filter) will be explained. The present inventors have discovered a following process. The process can include operations of: (1) preparing a starting material formed by mixing a carbon mixture and a ceramic binder of artificial or natural, the carbon mixture includes a base activated carbon powder having an average diameter of 35 μm (or above 30 μm)—200 μm and a super fine activated carbon powder having an average diameter of 30 μm or less; (2) forming a body by pressing the starting material; and (3) sintering the body to form a sintered activated block filter having a plurality of the pores.

The sintered activated block filter produced by the above mentioned process is effective: for improving ability for catching fungi such as viruses; for lowering a pore diameter because of increasing the amount of the super fine activated carbon powder; and for ensuring the amount of penetrating water per unit time because of mixing the base activated carbon powder whose average diameter is large in addition to the super fine activated carbon powder in such a manner that a practical water permeability is acquired. A principal reason of improving ability for catching fungi such as viruses is as follows: the activated carbon powder such as the super fine activated carbon powder having ability for catching fungi such as viruses is frequently exposed to a penetrating minute water-path formed in the sintered activated carbon block filter. In particular, it is assumed that the super fine activated carbon powder forms a site for adsorbing fungi such as viruses having a tendency to be negatively charged.

Further, for improving ability for catching fungi such as viruses and for achieving a practical water permeability, the present inventors have discovered following effective matters: (1) a proportional weight rate is effective between the carbon mixture and the ceramic binder; and (2) it is preferable that the amount of the carbon mixture is increased and that the amount of the ceramic binder of artificial or natural ceramic binder is decreased. Since the binder has a tendency to cover the surface of activated carbon powder particles, the activated carbon has a tendency to be hardly exposed to the penetrating minute water-path formed in the sintered activated carbon filter. So, when the amount of the ceramic binder is decreased, the activated carbon powder such as the super fine activated carbon powder is easy to be exposed to the penetrating minute water-path formed in the sintered activated carbon block filter.

Moreover, the present inventors have also discovered the effect that fungi such as viruses are disinfected by supplying boiling water to the sintered activated carbon block filter. Namely, when the artificial or natural ceramic binder is used, the sintered activated carbon block filter does not generate a thermal problem in the case where boiling water penetrates the sintered activated carbon block filter. This effect is different from resin binder.

According to a preferable process of the present invention, the process can include features of: (1) preparing a starting material by mixing a carbon mixture and a ceramic binder of artificial or natural, the carbon mixture is formed by mixing a base activated carbon powder having an average diameter of 35 μm (or above 30 μm)—200 μm with a super fine activated carbon powder having an average diameter of 30 μm or less; (2) setting the amount of the ceramic binder to be 50 weight % or less, and setting the amount of the carbon mixture to be 50 weight % or more, when the total amount of the carbon mixture and the ceramic binder is set to be 100 weight %; (4) forming a body by pressing the starting material; and (5) sintering the body to form the sintered activated block filter having a plurality of the pores.

The sintered activated block filter produced by the above mentioned process is effective: (1) for improving ability for catching fungi such as viruses; (2) for decreasing a pore diameter because of increasing the amount of the super fine activated carbon powder; and (3) for increasing the amount of penetrating water per unit time because of mixing of the super fine activated carbon powder and the base activated carbon powder whose average diameter is large so as to obtain a practical water permeability According to a preferable mode of the present invention, basic designing ideas can be set as the following matters of [1]–[3] in the sintered activated carbon block filter.

[1]

It is effective that to add a super fine activated carbon powder having an average diameter of 30 μm or less, in addition to a base activated carbon powder having a large average diameter. The super fine activated carbon powder can be easily exposed with high frequency to the penetrating minute water-path formed in the sintered activated carbon block filter. The super fine activated carbon powder can be preferable in a diameter of 30 μm or less—e.g., a diameter of 20 μm or less. So, when the super fine activated carbon powder is 100 weight %, particles of 1–20 μm diameter can be 80 weight % or more, and particles of below 1 μm diameter can be 20 weight % or less. Still, the base activated carbon powder is effective for increasing strength of the sintered activated carbon block filter, in ensuring water permeability per unit time, and in suppressing the surplus lowering of the pore diameter.

[2]

It is known that resin binder is considerably located in the negative side in the electrification column and that resin binder is electrically charged to a negative state. Also, it is known that fungi such as viruses are also electrically charged to a negative state on technical references. Therefore, it is guessed that the block filter using resin binder is insufficient in ability for catching fungi such as the viruses because of electrostatic refusal. On the other hand, when binder is artificial or natural ceramic system, influence of electrostatic refusal is suppressed in the block filter with respect to fungi such as viruses to be negatively charged—thereby catching or adsorbing ability is ensured for fungi such as viruses.

[3]

Binder has a tendency to cover the surface of the activated carbon powder; so, the super fine activated carbon powder is hard to be exposed to the penetrating minute water-path formed in the sintered activated carbon block filter because of the binder. Thus, the amount of the carbon mixture can be preferably higher and the amount of the ceramic binder can be preferably lower in the starting material which is formed by mixing the carbon mixture and the ceramic binder. That is to say, when the total of the carbon mixture and the ceramic binder is set to be 100 weight %, the ceramic binder can be preferably 50 weight % or less, and the carbon mixture can be preferably 50 weight % or more. When the amount of the ceramic binder is lowered, it is guessed that the activated carbon powder such as the super fine activated carbon powder is easy to exposed with high frequency to a penetrating minute water-path formed in the block filter.

By the above mentioned matters of [1]–[3], catching and adsorbing abilities are improved in the water purifier. Especially, it is effective for catching fungi such as viruses. So, it is possible that the sintered activated carbon block filter efficiently catch "brevundimonas" having an outer diameter of 0.3 μm and a length of 0.8 μm—the smallest testing bacteria in Japan. It is possible that the sintered activated carbon block filter efficiently catches "bacteriophage MS-2", namely, a substitutional fungus for polio-virus in U.S.A. This catching ability is obtained both at a test water pressure of 1.0 kgf/cm2 being used in Japan and at a test water pressure 60 psi (4.2 kgf/cm2) being used in U.S.A. Still, estimating tests generally can use substitutional fungi of "bacteriophage MS-2" instead of pathogenic polio-viruses.

According to a preferable mode of the present invention, basic designing ideas can additionally be set as the following matters of [4] and [5] in producing the sintered activated carbon block filter.

[4]

It is desirable that sintering temperature can be set to be 1200° C. or less (generally 950–1200° C.). This can prevent the pore of the sintered activated carbon block filter from shrinking superfluously in sintering so as to suppress deterioration of catching or adsorbing ability. Sintering time is varied depending on size of the block filter and sintering temperature—for example from 30 minutes to 50 hours.

[5]

It is preferable that compacting pressure increases for pressing the starting material. Compacting pressure may be for example 1 MPa. When the starting material is granulated, an increase of compacting pressure allows the contacting surfaces of granules to be crushed to advantageously lower the pore diameter.

Combining the above mentioned matters of [1]–[3] and the above mentioned matters of [4] [5] may be further effective in forming an ideal pore diameter of the sintered activated carbon block filter.

According to a preferable mode of the present invention, in the sintered activated carbon block filter used as a filtering material of the water purifier, when the amount of the super fine activated carbon is superfluously larger in the carbon mixture, the base activated carbon powder is insufficient in amount, and the sintered activated carbon block filter becomes inferior to be insufficient in strength. When the amount of the super fine activated carbon powder is superfluously smaller in the carbon mixture, insufficient pores are formed. According to the block filter (said one thing), a ratio of super fine activated carbon powder/base activated carbon powder can be preferable in the range 0.1–0.8 by weight ratio. In particular, in the range 0.2–0.5, in the range 0.25–0.40, or in the range 0.25–0.35.

When the average pore diameter of the block filter is superfluously larger, catching or adsorbing ability is lowered, while the amount of penetrating water is ensured per unit time. When the average pore diameter of the block filter is superfluously smaller, the amount of penetrating water is lowered per unit time, while catching or adsorbing ability is ensured. According to a preferable mode of the block filter, the most frequency peak of pore diameter can exist within 10 μm or less in a distribution of the pores. In this case, when the pore volume is set to be 100 volume %, the pore exceeding 10 μm can be set below 20 volume %, below 10 volume %, below 5 volume %, or 0 volume %.

According to a preferable mode of the block filter—in particular, according to said one thing in which average pore diameter and water permeability are relatively smaller—the total amount of the ceramic binder and the carbon mixture are set to be 100 weight %, a lower limit of the amount of the super fine activated carbon powder can be preferably, over 8 weight %, and over 14 weight %. For example, the lower limit may be over 10 weight %, over 15 weight %, over 20 weight %, or over 30 weight %. The upper limit of the amount of the super fine activated carbon powder may be below 40 weight %. This is advantageous in lowering average pore diameter.

According to a preferable mode of the block filter—in particular, according to said one thing in which average pore diameter and water permeability are relatively smaller—when the carbon mixture and the ceramic binder are set to be 100 weight %, the amount of the binder can be preferably set to 30–60 weight %, 30–50 weight %, 30–48 weight %, or 30–45 weight %. The binder can preferably include artificial or natural ceramic binder—at least one of alumina component and silica component is mainly contained.

According to a preferable mode of the block filter, the most frequency peak exists in 10 μm or less in the pore distribution of the block filter. Also, when the pore volume is set to be 100 volume %, the amount of the pores of 2.5 μm or less can be set to over 40 volume %, or over 50 volume %, and the pore exceeding 8 μm can be set to below 30 volume %. This is advantageous in lowing the pore diameter.

According to a preferable mode of the block filter—in particular, according to said one thing in which average pore diameter and water permeability are relatively smaller—it is preferable that the artificial or natural ceramic binder is smaller in particle diameter. Fine particle of the binder powder is effective for decreasing pore diameter of the block filter. The artificial or natural ceramic binder is preferable 150 μm or less in particle average diameter. The binder can be especially below 50 μm, below 30 μm, below 10 μm, and below 5 μm in particle average diameter.

According to a preferable mode of the block filter, when the binder of artificial or natural ceramic system is set to be 100 weight %, it is preferable that the minute particles having a diameter of 5 μm or less can be preferably over 30 weight %—in particular over 40 weight %, over 50 weight %, or over 60 weight %. When the binder of the artificial or natural ceramic system is set to be 100 weight %, it is preferable that the minute particles having a diameter of 5 μm or less can be over 70 weight %,—it is preferable that the minute particles having a diameter 1 μm or less can be over 30 weight %.

According to a preferable mode of the block filter, the amount of the binder of artificial or natural system can be smaller than that of carbon mixture. This case is advantageous in lowering the pore diameter of the block filter. When the proportion of the super fine activated carbon powder is abounding, crack problem may be sometimes generated in the block filter. However, when the particles of the ceramic binder is lowered in diameter, the block filter is ensured in strength to effectively suppress the crack problem.

According to a process technique of a preferable block filter, average particle size is larger in the base activated carbon powder for ensuring both strength and water permeability of the block filter. Therefore, when the base activated carbon powder is set to be 100 weight %, particles of 35–200 μm, or particles of 30–200 μm, can be set to 10–70 weight %. The super fine activated carbon powder has a smaller average diameter in comparison with the base activated carbon powder, and it has the particles having a diameter of 30 μm or less—especially a diameter of 20 μm or less. For the super fine activated carbon powder, when the super fine activated carbon powder is set to be 100 weight %, particles of 1–20 μm can be set over 80 weight %, and particles of under 1 μm can be set below 20 weight %. However, a proportional rate is not limited to this. The super fine activated carbon powder is advantageous for lowering the pore diameter of the block filter, while generating a somewhat tendency to decrease strength of the block filter.

According to a preferable process technique of the block filter, compacting pressure can be set over 1.0 MPa for pressing the starting material. In this case, it is advantageous to lower pore diameter by crushing the contacting surface of the carbon powder granules, when the starting material has a granular shape. Compacting pressure can be set over 1.2 MPa or 1.5 MPa. An upper limit of compacting pressure, depending on a pressing machine, can be set for example 2.0 MPa, 4.0 MPa, or 5.0 MPa.

In pressing the starting material formed by mixing the carbon mixture with the ceramic binder, since the surface of the activated carbon powder is covered with the ceramic binder, the activated surface area being formed in the activated carbon powder is easy to be decreased. So, according to a preferable process technique, since a proportion of the binder is set to be relatively smaller, the activated surface area of the activated carbon powder is easy to be exposed to the penetrating minute water-path formed in the block filter. Though the sintered activated carbon block filter, including the super fine activated carbon powder, is excellent in catching fungi such as viruses, it exhibits high pressure loss in supplying water to lower the water permeability.

Still, the above mentioned description on the sintered activated carbon block filter is preferably applied to the sintered activated carbon block filter whose average pore diameter is relatively smaller and whose water permeability is relatively smaller. Also, the above mentioned description on the sintered activated carbon block filter can sometimes be applied, on request, to the sintered activated carbon block filter whose average pore diameter is relatively larger and whose water permeability is relatively larger.

BRIEF DESCRIPTION OF THE DRAWING

A more complete appreciation of the present invention and many of its advantages will be readily obtained as the same becomes better understood by reference to the following detailed description when considered in connection with the accompanying drawing and detailed specification, all of which forms a part of the disclosure.

DETAILED DESCRIPTION OF THE PREFERRED EMBODIMENTS

Figure 1:
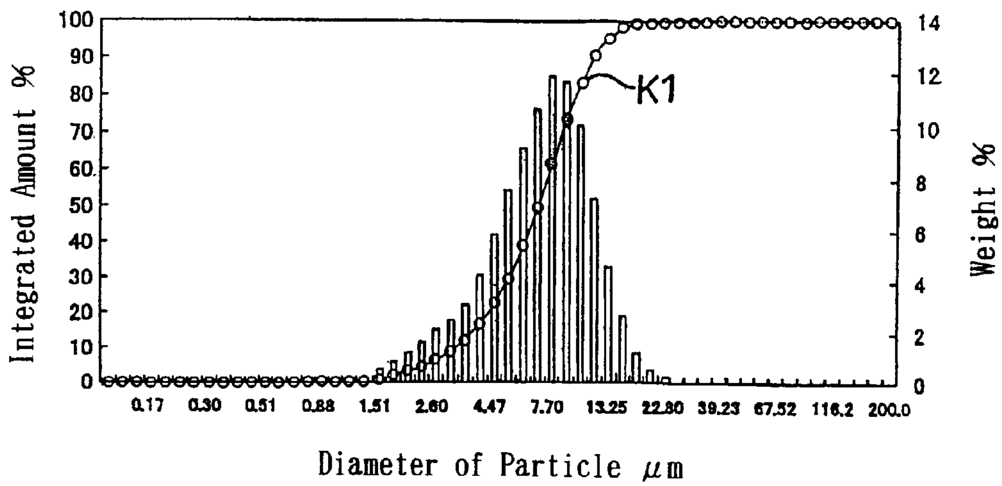
FIG. 1 is a graph which shows a distribution of the particle size of a super fine activated carbon powder.

Embodiments will be explained based on the accompanying figures. Firstly, manufacturing of a sintered activated carbon block filter constituting the filtering material will hereinafter be explained. In the super fine activated carbon powder used in the present embodiment, there are mostly occupied particles having a size of 20 μm or less. FIG. 1 shows a particle size distribution of the super fine activated carbon powder. For the super fine activated carbon powder, as shown in FIG. 1, the particle diameter is set within 25 μm, and the particles having 20 μm or less occupies 99.80 weight %. For the super fine activated carbon powder, the most frequency region is set in the range 4.47–13.25 μm, and a median diameter is set in 6–7 μm. The base activated carbon powder being used in the present embodiment has an average particle diameter of 30–100 μm.

Figure 2:
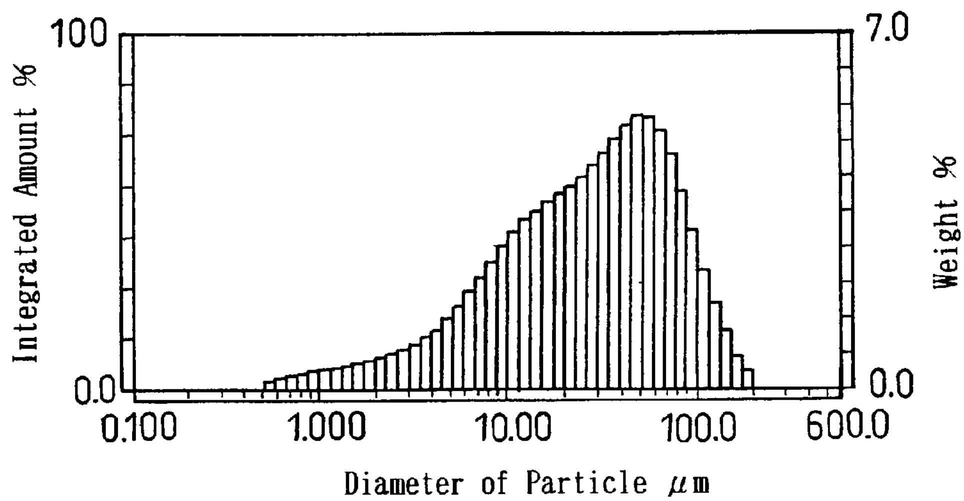
FIG. 2 is a graph which shows a distribution of the particle size of a carbon mixture in which a base activated carbon powder is mixed with the super fine activated carbon powder.

FIG. 2 shows a particle diameter distribution of the carbon mixture, concerning invention product No. 1, in which the base activated carbon powder is mixed with the super fine activated carbon powder. FIG. 2 indicates that the carbon mixture considerably contains the fine activated carbon powder having a diameter of 30 μm or less, when the whole of the carbon mixture is set to be 100 weight %. So, when the base activated carbon powder is set to be 100 weight %, the particles having a diameter of 35–200 μm occupies 10–70 weight %.

Figure 3:
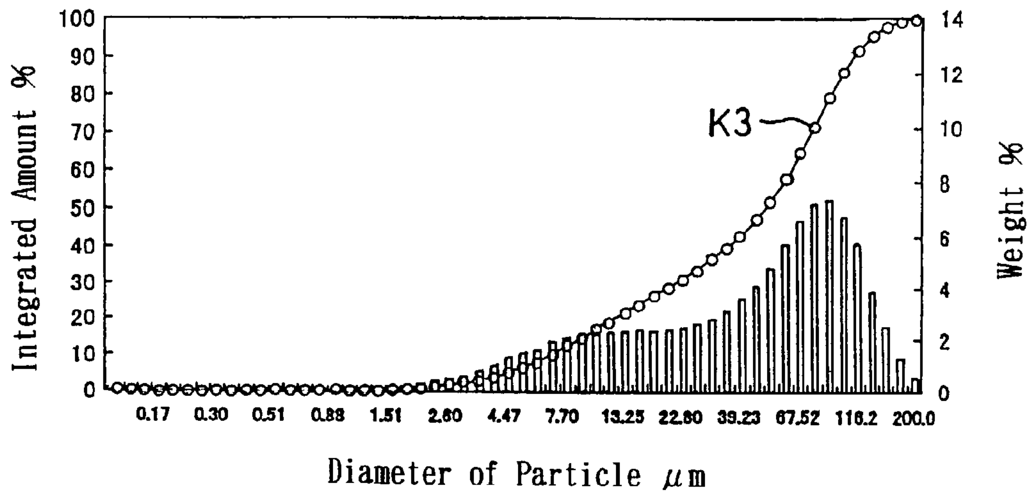
FIG. 3 is a graph which shows a distribution of the particle size of a carbon mixture concerning comparative product.

FIG. 3 shows the particle diameter distribution of carbon mixture concerning the comparative product. FIG. 3 indicates that the carbon mixture scarcely containing a super fine activated carbon powder having a diameter of 30 μm or less in the comparative product, when the whole of the carbon mixture is set at 100 weight %.

The ceramic binder used in the present embodiment is alumina-silica system (alumina: 40–70 weight %, silica: 30–60 weight %) having a diameter of 150 μm or less. That is to say, when the ceramic binder is set to be 100 weight %, 80 weight % of the ceramic binder is the super fine particle having a diameter of about 5 μm or less.

The present inventors have decided a mixing proportion of the ceramic binder, the base activated carbon powder, and the super fine activated carbon powder, shown in Table 1, for forming the starting material concerning invention product No. 1. In this case, the present inventors fully mixed the starting material by a mixer for mixing the activated carbon powder and the binder. After mixing the starting material by the mixer for 5 minutes, the present inventors sprayed water to the starting material, and stopped the mixing operation after 5 seconds. The produced particles have a small diameter, and they contain a small amount of moisture. If the produced particles scarcely contain an amount of moisture, the particles insufficiently combine with each other so as to form coarse pores. So, it is important to increase an amount of moisture in the starting material. In view of this, the present inventors provided a room moisturized by a high-pressure atomizer for setting a supersaturated humidity condition, kept the staring material in the room for 3 days, and thereby exceeded 50% in the amount of water of the starting material.

TABLE 1

| | invention product No. 1 | invention product No. 2 | invention product No. 3 | invention product No. 4 | invention product No. 5 | comparative product |
|---|---|---|---|---|---|---|
| binder | 48.0 wt % | 35.4 wt % | 58.0 wt % | 60.0 wt % | 30 wt % | 50 wt % |
| base activated carbon powder | 40.0 wt % | 54.0 wt % | 32.3 wt % | 30.0 wt % | 0 wt % | 50 wt % |
| super fine activated carbon powder | 12.0 wt % | 10.6 wt % | 9.7 wt % | 10.0 wt % | 70 wt % | 0 wt % |
| cartridge weight | 1495 g | 1501 g | 1519 g | 1545 g | 1430 g | 1388 g |
| sintering temperature | 1195° C. | 1195° C. | 1250° C. | 1195° C. | 1195° C. | 1100° C. |
| water amount (liter/minute) 4.2 kgf/cm = 60 psi | 2.5 | 1.5 | 2.0 | 0.75 | 0.3 | 5.2 |
| porosity rate | 39.7% | 41.9% | 38.0% | 35.3% | 39.1% | 37.0% |
| surface area | 517 m2/g | 380 m2/g | 365 m2/g | 300 m2/g | 490 m2/g | 620 m2/g |
| average pore diameter | 0.40 μm | 0.32 μm | 0.29 μm | 0.24 μm | 0.30 μm | 0.60 μm |
| chloroform-removing ratio at 8000 liters | 99.9% | 96.8% | 89.5% | 84.6% | No Test | 73.3% |
| amount of dusts of 0.3 μm | below 10 | 40~50 | 600 | 20 | No Test | 5000 |
| amount of brevundimonas 0.3 μm/ 1,200,000~ 3,500,000 amount of bacteriophage | 0 | 510 | No Test | 350 | No Test | exceeding 1000 |

TABLE 1-continued

| | invention product No. 1 | invention product No. 2 | invention product No. 3 | invention product No. 4 | invention product No. 5 | compara-tive product |
|---|---|---|---|---|---|---|
| MS-2 | | No Test | No Test | | No Test | probably permination |
| at 2.1 kgf/cm2 | 0 | | | 0 | | |
| at 4.2 kgf/cm2 | 0 | | | below 50 | | |

Using a hydraulic pressing machine, the present inventors pressed the aggregate of the starting material having a granular shape at a pressure of 1.5 MPa to form a body having a cylinder shape having an outer diameter of 129 mm, an inner diameter of 29 mm, and a height of 200 mm. Afterwards, the present inventors dried the body by a hot wind, fired the body in a nitrogen atmosphere at the maximum of temperature 1195° C. by a continuous tunnel kiln having a transit time of 10 hours, and thereby produced a sintered activated carbon block filter concerning invention product No. 1 shown in Table 1.

In addition, based on conditions shown in Table 1, the present inventors prepared a starting material concerning invention product No. 2 by a similar procedure to form a block filter concerning invention product No. 2. This case uses the above mentioned base activated carbon powder, the above mentioned super fine activated carbon powder, and the above mentioned binder. Based on conditions shown in Table 1, the present inventors respectively prepared each of starting material concerning invention product Nos. 3–5 by a similar procedure so as to form each of block filters concerning invention product Nos. 3–5. Also, the present inventors produced the comparative product.

Table 1 shows physical properties of the block filters. As shown in Table 1, in invention product No. 1, the amount of binder is 48% by weight ratio, being below the amount of carbon mixture (52%=40%+12%). In invention product No. 2, the amount of binder is 35.4% by weight ratio, being below the amount of carbon mixture (64%=54%+10%). In invention product No. 3, the amount of binder is as much as 58%. In invention product No. 4, the amount of binder is as much as 60%. Invention product No. 5 contains binder as little as 30%, including the super fine activated carbon powder, and not including the base activated carbon powder. The comparative product includes the base activated carbon powder, not including the super fine activated carbon powder.

When a proportion of the super fine activated carbon powder is abounding, the sintered activated carbon block filter lowers in strength to be broken. However, according to the present embodiment, as above mentioned, since the particles of the ceramic binder, artificial binder or natural binder, is set to be small in grain size, the sintered activated carbon block filter is advantageously improved in strength so as to reduce a pore diameter in the sintered activated carbon block filter.

Figure 4:
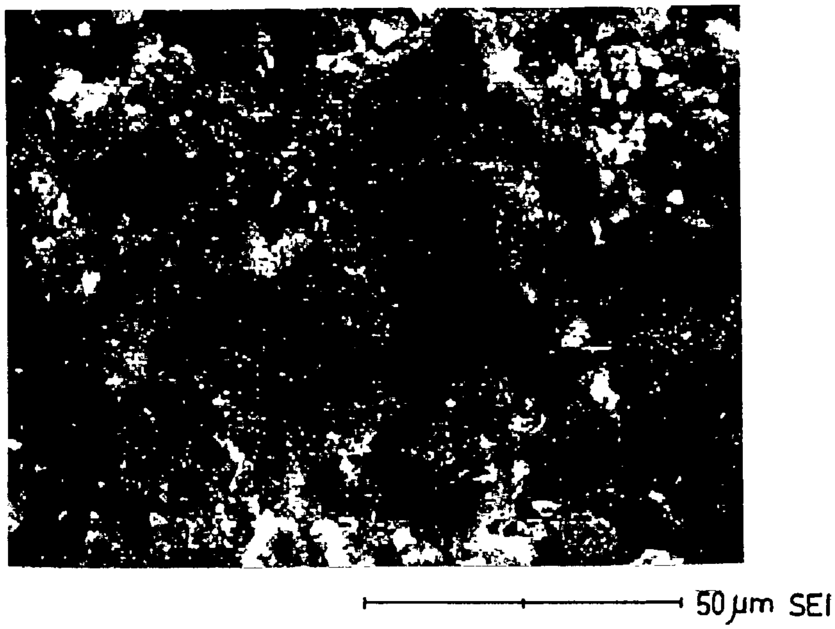
FIG. 4 is a photomicrography (magnification: ×1000) of a block filter concerning invention product No. 1.
Figure 5:
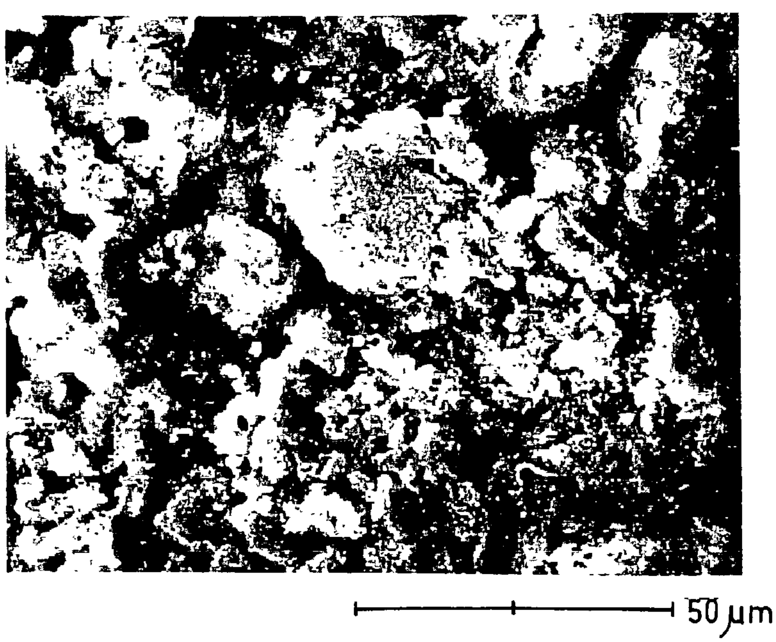
FIG. 5 is a photomicrography (magnification: ×1000) of a block filter concerning a comparative product.

FIG. 4 shows a photomicrography (test piece: No. 11-3) of the sintered activated carbon block filter concerning invention product No. 1. FIG. 5 shows a photomicrography (test piece: No. 2W-3) of the sintered activated carbon block filter concerning the comparative product. In FIGS. 4 and 5, a blackish area shows the activated carbon powder, and a whitish area shows the ceramic based binder. As shown in FIG. 4, in invention product No. 1, since the blackish area is large, it is understood that the activated carbon powder such as the super fine activated carbon powder is frequently exposed to a penetrating minute water-path formed in the block filter. So, invention product No. 1 is advantageously improved in catching and adsorbing abilities. Still, FIG. 4 suggests that the blackish area is about 70–85 area % when the whole visual field shown in FIG. 4 is set at 100 area %. As shown in FIG. 5, in the comparative product, since the whitish area is large, it is understood that the binder is frequently exposed to a penetrating minute water-path formed in the block filter and that the activated carbon powder is scarcely exposed to the penetrating minute water-path. Such comparative product is not effective in catching and adsorbing abilities.

Figure 6:
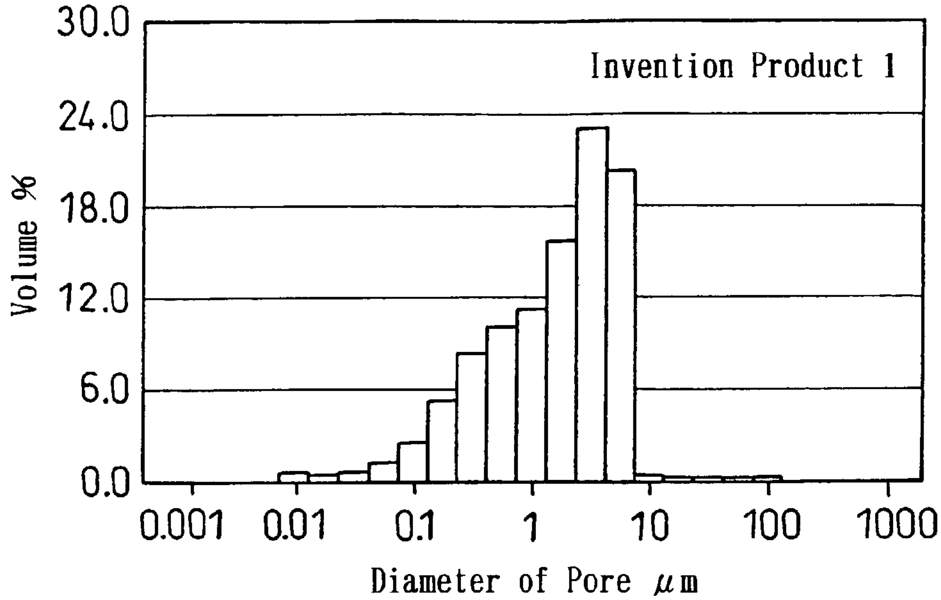
FIG. 6 is a graph which shows a pore distribution of the block filter concerning invention product No. 1.

FIG. 6 shows a distribution of pore diameter of the sintered activated carbon block filter concerning invention product No. 1. This distribution is measured by mercury inserting method. As shown in FIG. 6, invention product No. 1 with a small pore diameter does not substantially contain the pores exceeding 10 $\mu$m, and it is sufficient in pore diameter. Invention product No. 2 indicates the same pore-distribution as invention product No. 1. That is to say, for the sintered activated carbon block filters concerning invention product Nos. 1 and 2, when the pore volume is set at 100 volume %, the pores having a pore diameter of 2.5 $\mu$m or less are set over 40 volume % or more, and the pore having a pore diameter exceeding 8 $\mu$m is fewer. This result allows the amount of pore volume to become large so as to increase an amount of water discharged from the sintered activated carbon block filter. Also, this result allows the pore diameter to be small to effectively catch viruses.

Figure 7:
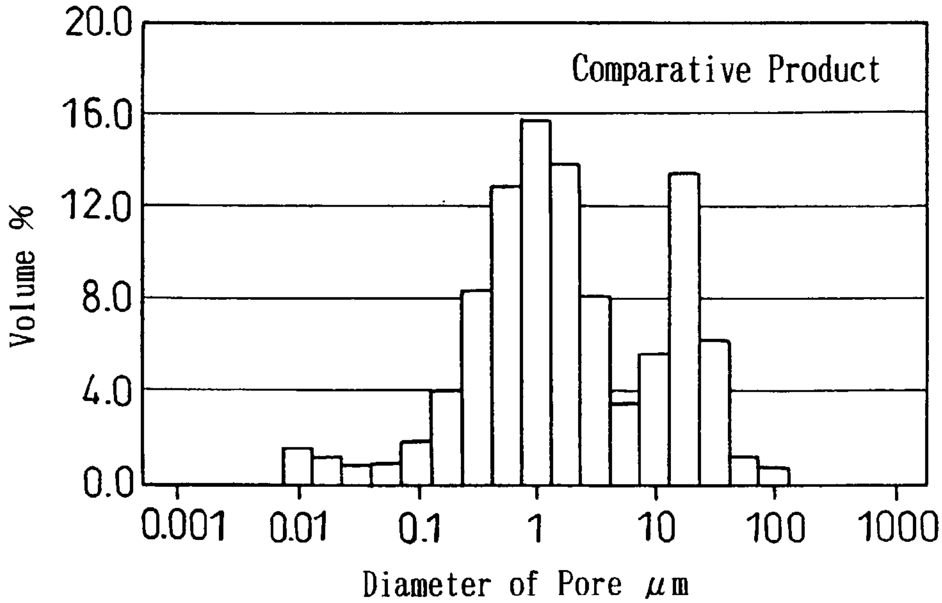
FIG. 7 is a graph which shows a pore distribution of the block filter concerning the comparative product.

FIG. 7 shows a distribution of pore diameter of the sintered activated carbon block filter concerning the comparative product. In the sintered activated carbon block filter concerning the comparative product, the pore diameter is coarse, and the coarse pore of exceeding 20 $\mu$m is large in volume %. As shown in FIG. 7, in the comparative product, the minute pores of 2.5 $\mu$m or less is relatively abounding, a frequency peak is near 20 $\mu$m in diameter, and coarse pores of about 100 $\mu$m are considerably existed. The existence of coarse pores over 20 $\mu$m can increase the amount of penetrating water per unit time, while it is not sufficient in capture or absorption ability of the sintered activated carbon block filter.

As shown in Table 1, invention product Nos. 1 and 2 are 39–42% in the porosity rate of the block filter. In the meantime, the comparative product not including the super fine activated carbon powder porosity is as little as 37% in the porosity rate of the block filter. For compressive strength, invention product Nos. 1–4 are sufficient. However, compressive strength is considerably lowered in invention product No. 5 not including the base activated carbon powder. Compressive strength is higher in the comparative product not including the super fine activated carbon powder. A chloroform-removing ratio is measured by inserting starting water dissolving chloroform having a concentration of 40 ppb into the block filter. For the chloroform-removing ratio, invention product Nos. 1 and 2 are sufficient in comparison with invention product Nos. 3, 4 and the comparative product.

Test For Removing Dust Particle

The present inventors carried out a test by inserting air including dust particles having a diameter of approximately 0.3 μm into the block filter. Dust particles held in the air are measured per air of 1 liter by a laser beam. For measuring the number of dust particles, which penetrate the block filter, having an average diameter of 0.3 μm, as shown in Table 1, invention product No. 1 exhibits below ten (10), so it is sufficient. Invention product No. 2 exhibits the range from forty to fifty (40–50), so it is sufficient. Invention product No. 3 exhibits six hundred (600), so it is good. Invention product No. 4 exhibits twenty (20), so it is sufficient. Invention product No. 5 is not measured because of insufficient strength. The comparative product exhibits over five thousand (5,000), so it is insufficient. According to this test, in air of 1 liter before penetrating the block filter, the number of dust particles having a diameter of 0.3 μm are measured on the average of forty-five thousand (45,000). Thus, invention product Nos. 1, 2, 3, and 4 are good in catching the fine particles in comparison with the comparative product. In particular, invention product Nos. 1 and 2, having a small amount of binder, are excellent in catching the fine particles in comparison with invention product Nos. 3, 4, and the comparative product.

Penetrating Test of "brevundimonas fungus"

The present inventors also carried out a test in which "brevundimonas fungus" having an outer diameter of 0.3 μm and a length of 0.8 μm penetrates the block filter. In invention product No. 1, though an average pore diameter of the block filter exhibits 0.40 μm to be a comparative large, the number of "brevundimonas fungi" which penetrate the block filter is 0—so, catching ability is excellent in invention product No. 1. In invention product No. 2, the number of "brevundimonas fungi" which penetrate the block filter is 510/ml/3,500,000—so, catching ability is sufficient. The terms of "510/ml/3,500,000" means the number of "brevundimonas fungi" which penetrate the block filter is five hundred and ten (510) in the case where water is used including three million five hundred thousand (3,500,000) of "brevundimonas fungi" per water of 1 ml (milliliter). The invention product No. 4 is three hundred and fifty, 350/ml/1,200,000—so, catching ability is good.

In the comparative product whose water-discharging ability is sufficient and whose catching ability is not always sufficient, the number of "brevundimonas fungi", which penetrate the block filter, exceeds one thousand (1,000)—so, catching ability is insufficient. Therefore, invention product Nos. 1–4 have a superiority in catching ability in comparison with the comparative product. In particular, invention product Nos. 1 and 2 can provide the sintered activated carbon block filter with bacteria-proof in comparison with the comparative product.—so, invention product No. 1 is very sufficient in catching ability.

Test for Removing Substitutional Fungi for Polio Viruses

The present inventors carried out a test for removing substitutional fungi for polio viruses. Since there is seldom a crisis of poliomyelitis, Japan does not impose legal controls in removing polio viruses. However, advanced countries of water supply, such as U.S.A, impose legal controls in removing polio viruses as a standard of purified water. In view of this situation, half of water purifiers used in home of U.S.A. are a reverse osmosis membrane type having a pore diameter of 10 Å (angstrom)—this is defense for polio viruses in each home. The polio virus has a spherical shape of 25–35 nm (250–350 Å: 0.025–0.035 μm) in outer diameter, and it has a plurality of protrusions in circumference thereof. The test using polio viruses is very dangerous. Then, U.S.A. allows "bacteriophage MS-2" with an almost equal size and shape as a substitutional fungus in medical fields and the like. So, the present inventors carried out a water penetrating test using "bacteriophage MS-2". The starting water before penetration includes the number of MS-2 of 1,000,000/ml.

Table 1 shows test results. As shown in Table 1, invention product No. 1 do not allow penetration of "bacteriophage MS-2". It is appreciated that the block filter concerning invention product No. 1 can effectively catch polio viruses or "bacteriophage MS-2". A plenty of activated carbon powders such as super fine activated carbon powders are frequently exposed to the minute water-path for penetrating water in the block filter concerning invention product No. 1, as shown in FIG. 4. Water pressure is set at 30 psi (2.1 kgf/cm2) and 60 psi (4.2 kgf/cm2), respectively in this test. Especially, the water pressure of 60 psi is similar to the average water pressure in U.S.A. Invention product No. 4 has a small average pore diameter of 0.24 μm in the above block filter, being anticipated in catching "bacteriophage MS-2". Invention product No. 4 do not allow the penetration of "bacteriophage MS-2" at a water pressure of 30 psi (2.1 kgf/cm2). Also, invention product No. 4 reduces the penetration number of "bacteriophage MS-2" to below 50 at a water pressure of 60 psi (4.2 kgf/cm2).

Incidentally, the compressed activated carbon powder with polyethylene binder is generally used in U.S.A., and the hollow fiber membrane of the polypropylene is generally used in Japan. It is known that they can remove soluble lead and lead ions. Also, it is known that material of polyethylene and polypropylene become negatively to generate negative static electricity having a voltage tens of thousand volts in water. So, lead ions having electrically positive charges is easy to be adhered to polyethylene or polypropylene by electrostatic absorption.

However, no reports indicate that viruses such as polio viruses are caught by the block filter having polyethylene binder. This is because the virus having negative charges is seldom adhered to polyethylene or polypropylene to be negatively charged. There are some reports of catching fungi—"brevundimonas" with a diameter of 0.3 μm, a smallest diameter to be caught by pores, "*escherichia coli*" with a diameter of 0.65 μm, "protozoans" with several tens μm, and fungi with several tens μm.

It is known that "bacteriophage MS-2" for working as a substitutional fungus for polio virus is totally composed of capsid protein of "VP1–VP4", and it is covered with "VP1–VP3" to exhibit an electrically negative charge because of carboxyl group. Therefore, it is estimated that viruses with an electrically negative charge is not caught by polyethylene binder because of electrostatic refusal—polyethylene binder whose surface is to be an electrically negative charge.

On other hand, on using conditions of the block filter of water purifiers, it is appreciated that the ceramic binder such as the artificial ceramic binder or natural ceramic binder is not charged in an electrically negative or positive state. Therefore, it is appreciated that the block filter using the ceramic binder can catch viruses having an electrically negative charge without generating an electrostatic refusal, unlike the polyethylene binder which is easy to become negatively.

Conventionally, some references disclose that methods using the flocculant of electrically positive charge—e.g., "water petrifying technology" (published by Gihoudou company, on page 45, "item of condensation and flock") as a technology for removing viruses having a negative charge in a water supplying field. Also, it is known that virus become electrically negative charge in various quarters.

Since invention product No. 5 extremely reduces a proportion of the ceramic binder and do not include the base activated carbon powder, it has a porosity rate of 39.1%. Invention product No. 5, however, is insufficient in sintered strength so that pores quickly collapse because of pressure of penetrating water. Further, the present inventors individually carried out the operations of: (1) producing test specimens at a compacting pressure of 3.1 MPa, 2.5 MPa, and 0.8 MPa, respectively, not be shown in Table 1, with selecting the same composition as invention product No. 5; and (2) measuring pore distributions of the sintered activated carbon block filters of test specimens. When the base activated carbon powder is not mixed and when the binder is as low as about 30%, even if the compacting pressure is increased, the pores are quickly collapsed. So, invention product No. 5 is applicable in the case where the pressure of the penetrating water is small, or the case where a collapse of pores do not affect a practical usage.

Also, the comparative product includes the base activated carbon powder, never including the super fine activated carbon powder. So, a rate of activated carbon powder is 50 weight % and the alumina binder is 50 weight % in the starting material of the comparative product. Accordingly, the block filter concerning the comparative product is considerably varied in pore diameter and in the pore distribution of the block filter, depending on compacting pressure. Namely, it has a tendency in which the porosity rate of the block filter is decreased with increasing compacting pressure. Keeping a coarse pores, the block filter concerning the comparative product considerably includes bulky pores having a diameter from 2.5 μm to several tens μm. Accordingly, it is appreciated that mixing of the fine activated carbon powder such as the super fine activated carbon powder is effective in lowering the pore diameter of the block filter.

As above mentioned, when the amount of ceramic binder is little in the starting material, the increasing of compacting pressure is not effective in lowering the pore diameter of the sintered activated carbon block filter—the increasing of the amount of the super fine activated carbon powder is effective in lowering the pore diameter.

The present embodiment selects silica-alumina based binder as a ceramic binder. The present embodiment can select at least one of silica, magnesia, clay based binder, etc., having binding ability. The present embodiment can use them with the silica-alumina based binder or without the silica-alumina based binder.

Figure 8:
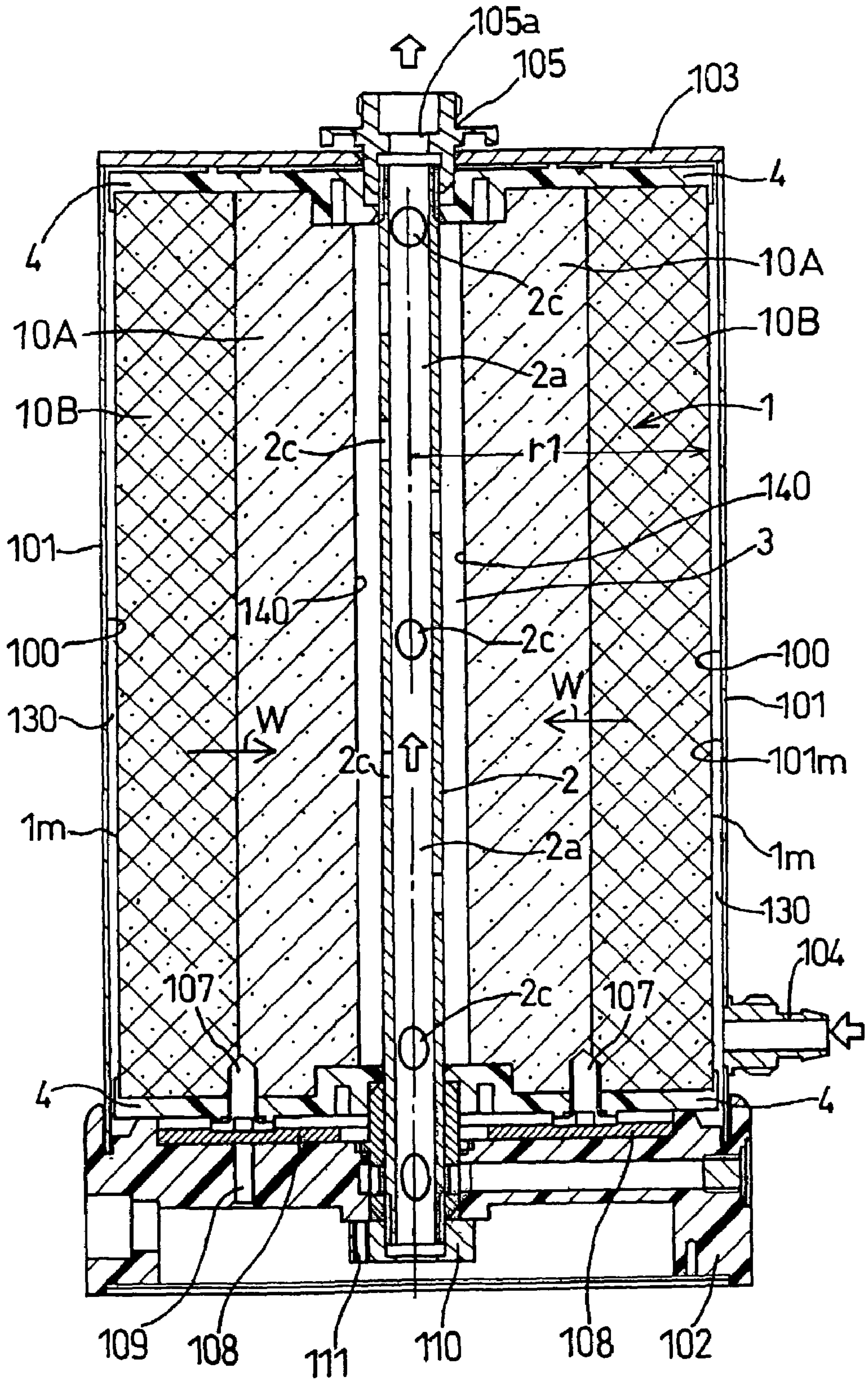
FIG. 8 is a sectional view of a water purifier concerning embodiment 1, having a filtering material formed of an outside filtering material concerning the invention product and an inside filtering material concerning the comparative product.

FIG. 8 shows a water purifier concerning embodiment 1. Filtering material 1 provided with the water purifier is formed of a block filter. The filtering material 1 has a vertical cylindrical shape, having an outer diameter of 122 mm, an inner diameter of 35 mm, and a height of 186 mm. The filtering material 1 has an inner circumference surface 140 forming a hole 3 formed along an axial direction, a vertical direction, in a central portion thereof. There are fixed caps 4,4 made of resin for preventing a collapse of axial end surfaces of the filtering material 1. The caps 4,4 are fixed at the filtering material 1 with adhesive such as silicon adhesive. Since the caps 4,4 cover the axial end surfaces of the filtering material 1, the caps 4,4 prevent water from flowing from the axial end surface of the filtering material 1 in such a manner that water penetrates the filtering material 1 in a radius direction. Especially, this advantageously allows water to penetrate the filtering material 1 from the outer circumferential portion of the filtering material 1 to the central portion of the filtering material 1.

As shown in FIG. 8, the water purifier includes: (1) a cylindrical container 101 having a room 100 and formed of metal material such as stainless steel to exhibit electrical conductivity; (2) the filtering material 1 having water permeability and contained vertically in the room 100 of the container 101; (3) an inner cylinder 2 for working as a cylindrical member and disposed vertically in the hole 3 of the filtering material 1; (4) a pedestal 102 formed of material not having an electrical conductivity (for example resin and disposed at the bottom of the container 101; (5) a lid 103 formed of material having an electrical conductivity, for example metal such as stainless steel, and disposed for covering an upper opening of the container 101; (6), a water supplying portion 104 disposed at an outer circumferential portion of the container 101 for supplying water to the room 100 of the container 101; (7) a water discharging portion 105 disposed at the central portion of the upper portion of the container 101 and communicated with the room 100 and the inner cylinder 2; (8) several first electrodes 107 having a projection shape formed of material having an electrical conductivity, for example metal such as titanium alloy or copper alloy, and inserted into the bottom of the filtering material 1; (9) a conductive member 108 electrically connected with the first electrode 107; (10) an electrode terminal 109 (a first electrode terminal) electrically connected with the first electrode 107 by way of the conductive member 108; (11) a second electrode 110 held on the pedestal 102 and electrically connected with the lower portion of the inner cylinder 2; and (12) an electrode terminal 111 (a second electrode terminal). electrically connected with the second electrode 110 and attached at the container 101 by way of the inner cylinder 2 and the lid 103.

The inner cylinder 2 has a plurality of openings 2*c* in the circumferrencial wall thereof for inducing water. The conductive member 108 has a ring shape and is disposed at the bottom surface of the filtering material 1. The inner cylinder 2 is formed of conductive material, for example metal. The container 101 has a cylindrical shape whose axial line is vertically disposed. The lid 103 closes the upper opening of the container 101. The lid 103 is electrically connected with the outer circumferential portion of the container 101 and the inner cylinder 2. So, the outer circumferential portion of the container 101 and the inner cylinder 2 will be in the same electrical pole. The inner cylinder 2 has a way 2*a* disposed vertically and communicated with the water discharging portion 105.

As shown in FIG. 8, the filtering material 1, being placed in the water purifier, has a cylindrical shape. The filtering material 1 is formed of both of: an inside filtering material 10A (said another thing) having a cylindrical shape disposed inside; and an outside filtering material 10B (said one thing) having a cylindrical shape coaxially disposed outside. The outside filtering material 10B (said one thing) is coaxially disposed with the inside filtering material 10A (said another thing). The outside filtering material 10B (said one thing) is composed by a fine pore layer formed by a sinter activated carbon block filter of invention product No. 1 or 2 including the super fine activated carbon powder. As above mentioned, in invention product No. 1 or 2, ability is excellent for catching fungi such as viruses, pressure loss is high in supplying water, and the amount of penetrating water is small per unit time. Then, for compensating water permeability, the inside filtering material 10A (said another thing) does not include the super fine activated carbon powder, and it is composed by a coarse pore layer formed of the comparative product (shown in Table 1) in which the average pore diameter is coarse. For the comparative product, ability is not always sufficient for catching fungi such as viruses, pressure loss is lower in supplying water, and the amount of penetrating water is large per unit time. Therefore, the water purifier can increase the amount of penetrating water per unit time, while ensuring the ability for catching fungi such as viruses.

According to the water purifier, the inside filtering material 10A and the outside filtering material 10B may integrally be formed in a unit. Also, the inside filtering material 10A may be coaxially fitted with the outside filtering material 10B.

As above mentioned, since the outside filtering material 10B (said one thing) formed of invention product No. 1 or 2 is composed of a fine pore layer, it is smaller in the amount of penetrating water per unit time. In this respect, the outside filtering material 10B is large in a radius distance of "r1" between a center line of the filtering material 1 and the outer surface thereof (shown in FIG. 8). So, the outside filtering material 10B is advantageous in increasing a starting surface of the water-penetrating area of the filtering material 1. As a result, the outside filtering material 10B is large as much as possible in the amount of penetrating water per time, thereby increasing the amount of purified water in the water purifier.

The present embodiment forms a clearance 130 having a ring shape coaxially between an outer circumference surface 1*m* of the filtering material 1 and an inner circumference surface 101*m* of the container 101. Since the first electrode 107 is set as a positive electrode; so, the filtering material 1 in which the first electrodes 107 are buried has a positive electrode surface. The second electrode 110 is set as a negative electrode. Therefore, the inner cylinder 2 formed of the electrical conductive material to be conducted with the second electrode 110 will become a negative electrode. The pores are communicated with each other to exhibit water permeability.

When water is purified by using the water purifier, the electrode terminal 109 electrically connected with the first electrode 107 is set in a positive pole, and the electrode terminal 111 electrically connected with the second electrode 110 is set in a negative pole. In this condition, voltage (for example, voltage of 1–10 volts, 1–5 volts, or 2–3 volts) is applied to the electrode terminals 109 and 111. The voltage is DC (direct current) voltage. The filtering material 1 is electrically connected with the first electrode 107, it will fundamentally become positively. The inner cylinder 2 are connected with the second electrode 110 will become a negative electrode. The container 101 is connected with the upper portion of the inner cylinder 2 by way of the lid 103. So, the container 101 will become negatively. As a result, voltage is applied to the filtering material 1 in a radius direction thereof, and voltage is applied to fungi caught in the pores of the filtering material 1 to disinfect the fungi. Since voltage is applied to the filtering material 1 in a radius direction thereof,voltage is advantageously applied to the whole of the filtering material 1.

In purifying water, water is supplied into the room 100 from the water supplying portion 104. The water is supplied in the clearance 130 between the outer circumference surface 1*m* of the filtering material 1 and the container 101. Further, the water penetrates the inside of the filtering material 1 in a centripetal direction exhibiting an arrow direction of "W", a radius direction, from the outer circumferential surface of filtering material 1 to the center area thereof. Though a compressive force is generated to the filtering material 1 in the centripetal direction, a tensile force can not work to the filtering material 1. Because the water penetrates the filtering material 1 in an arrow direction of "W". So, this can advantageously avoid fracture of the filtering material 1, even if water pressure is higher.

As shown in FIG. 8, since the water discharging portion 105 is disposed at the upper portion of the container 101 to face the central area of the upper portion of the filtering material 1, the water can advantageously run in the centripetal direction, the radius direction, from the outer circumferential surface of filtering material 1 to the center area thereof.

Water runs in the centripetal direction, the arrow direction of "W", from the outer circumferential surface of the filtering material 1 to the center area thereof. So, firstly, water penetrates the filtering material 10B (said one thing) whose average pore diameter is relatively smaller and whose water permeability is relatively smaller per unit time. Secondly, the water penetrates the filtering material 10A (said another thing) whose average pore diameter is relatively larger and whose water permeability is relatively larger per unit time. As a result, fungi, dusts and the like are effectively caught by the filtering material 10B placed apart from the water discharging portion 105, thereby keeping the filtering material 10A clean as much as possible.

The water penetrated the filtering material 1 comes to the hole 3 of the filtering material 1, and it flows from the openings 2*c* of the inner cylinder 2 disposed in the filtering material 1 to the way 2*a* of the inner cylinder 2. The water runs upwards along the way 2*a* of the inner cylinder 2, and it is discharged as purified water from the outlet 105*a* of the water discharging portion 105 disposed at the upper portion of the container 101.

Since voltage is applied, the pore inwall of the filtering material 1 may exhibit a positive charge. The pore inwall catches or adsorbs fungi such as superfine viruses having a diameter of 25–35 nanometer (nm) by electrostatic adsorption effect, thereby fixing the fungi in the pores of the superfine activated carbon powder constituting the exposed inwall of pores. So, the pore inwall prevents the fungi from being emitted. This can improve catching and absorptive abilities of the filtering material 1.

Still, the above usage shows that the first electrode 107 and the electrode terminal 109 are positive, and the second electrode 110 and the electrode terminal 111 are negative. Also, it is possible that the first electrode 107 and the electrode terminal 109 are negative and the second electrode 110 and electrode terminal 111 are positive. Such case can apply voltage to the filtering material 1 in a radius direction to carry out an electrical fungicide.

The above mentioned block filter, whose ability is excellent in catching viruses, can catch or adsorb viruses and bacteria. However, there is a problem that fungi such as viruses and bacteria caught in the inside of the filtering material 1 exists. Therefore, all components of the water purifier are formed of material having heat-resistance of 90–100° C. Therefore, the water purifier can periodically be cleaned by supplying boiling water to the water purifier. It is known that fungi such as viruses and bacteria die over 75° C. within at least 1 minute. Still, alternating voltage can be applied to the first electrode 107 and the second electrode 110.

Embodiment 2

Figure 9:
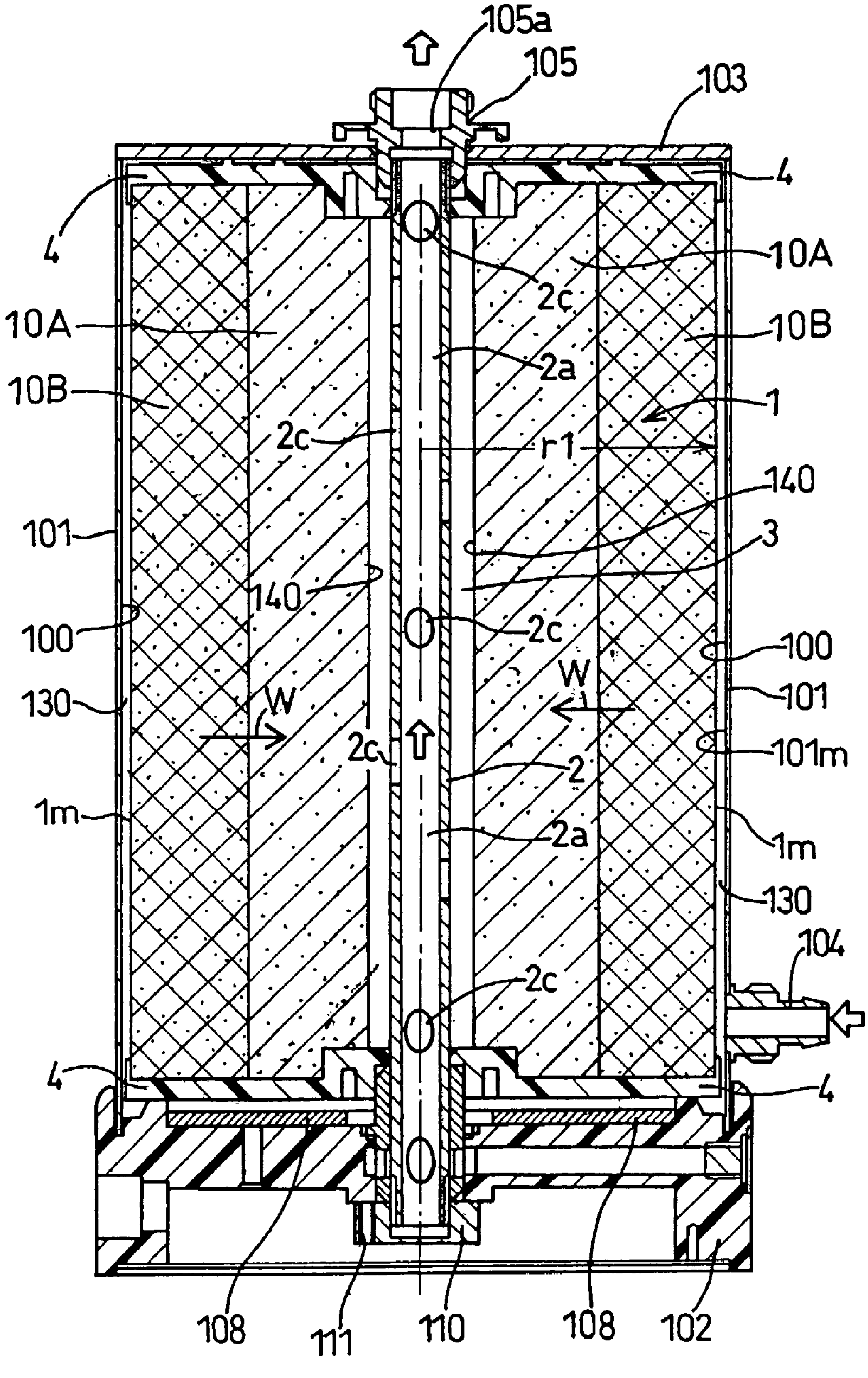
FIG. 9 is a sectional view of a water purifier concerning embodiment 2, having a filtering material formed of an outside filtering material concerning the invention product and an inside filtering material concerning the comparative product.

FIG. 9 shows embodiment 2. A water purifier concerning embodiment 2 is fundamentally identical with that of embodiment of 1 in structure and effect. The common portion is referred to the common code. In embodiment 2, a filtering material 1 mounted on the water purifier includes: (1) an inside filtering material 10A (said another thing) having a cylindrical shape and disposed inside; and (2) an outside filtering material 10B (said one thing) having a cylindrical shape and disposed coaxially outside for forming in a multiple layer structure. The outside filtering material 10B (said one thing) is coaxially disposed with the inside filtering material 10A (said another thing). The outside filtering material 10B is composed of a fine pore layer formed by the block filter of invention product No. 1 or 2 including the super fine activated carbon powder. As above mentioned, for invention product No. 1 or 2, ability is excellent for catching fungi such as viruses, pressure loss is high in supplying water, and the amount of penetrating water is small per unit time.

Then, for compensation of water permeability, the inside filtering material 10A—said another thing—does not include the super fine activated carbon powder, and it is composed by a coarse pore diameter layer formed of the comparative product (shown in Table 1) in which the average pore diameter is large. For the comparative product, ability is not excellent for catching fungi such as viruses, pressure loss is lower, and the amount of penetrating water is large per unit time. Therefore, the water purifier concerning embodiment 2 can increase the amount of penetrating water per unit time, while ensuring ability for catching fungi such as viruses. However, embodiment 2 is not provided with the first electrode 107, and it does not apply voltage to the filtering material 1. Even when voltage was not applied to the filtering material 1, electromotive force naturally generated in water was 250 mV and 400 $\mu$A (micro ampere) by electroconductive different materials in such a manner that the filtering material 1 formed by the block filter is electrically charged in a positive.

Embodiment 3

Figure 10:
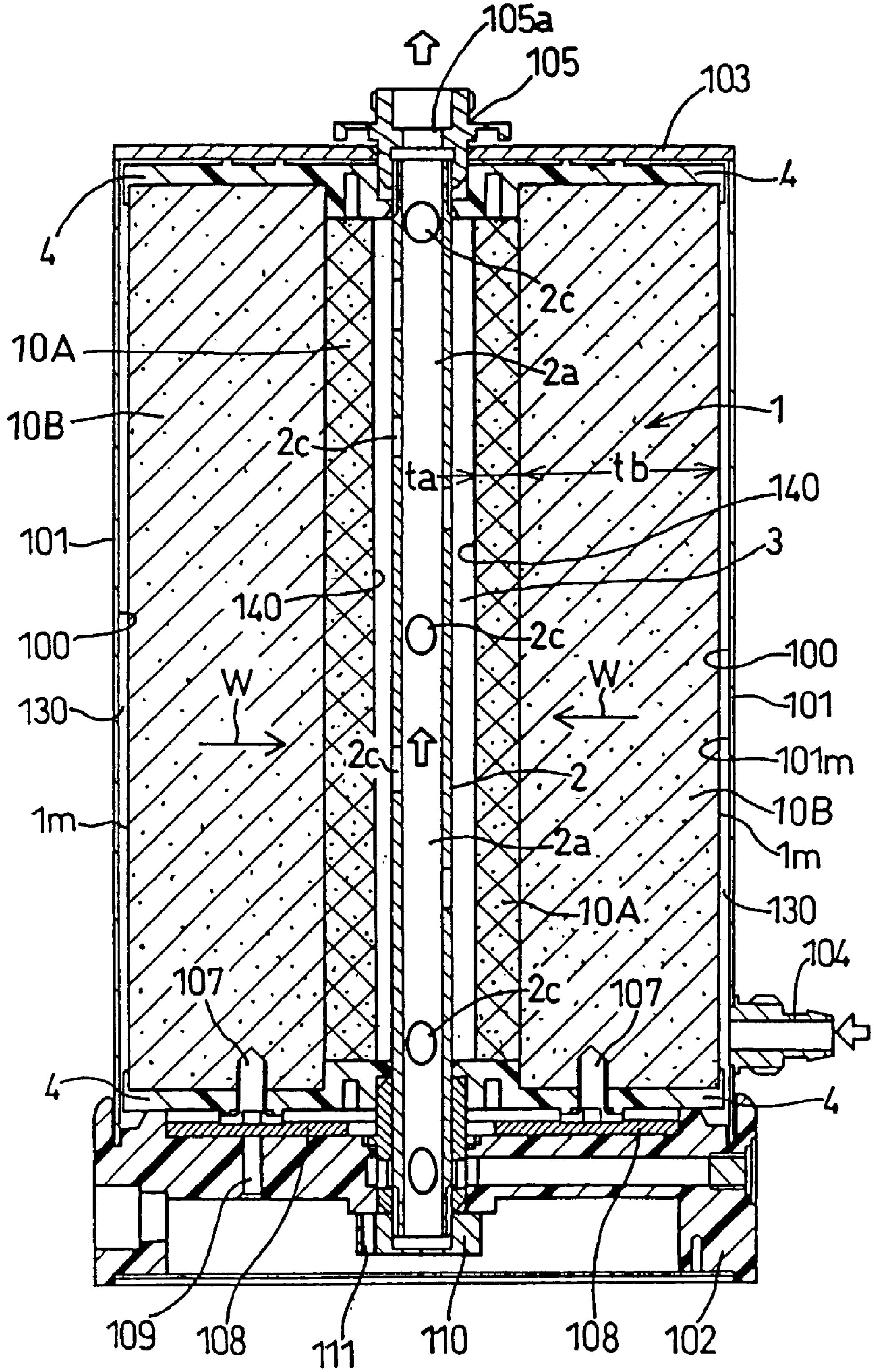
FIG. 10 is a sectional view of a water purifier concerning embodiment 3, having a filtering material formed of an inside filtering material concerning the invention product and an outside filtering material concerning the comparative product.

FIG. 10 shows embodiment 3. A water purifier concerning embodiment 3 is fundamentally identical with that of embodiment 1 in structure and effect. The common portion is referred to the common code. As shown in FIG. 10, in embodiment 3, a filtering material 1 mounted on the water purifier includes: an inside filtering material 10A (said one thing) having cylindrical shape and disposed inside; and an outside filtering material 10B (said another thing) having a cylindrical shape and disposed coaxially outside.

The inside filtering material 10A shown in FIG. 10—said one thing—is coaxially disposed with the out inside filtering material 10B. The inside filtering material 10A (said one thing) is composed of a fine pore layer formed by a block filter of invention product No. 1 or 2 including the super fine activated carbon powder and the ceramic binder. Invention product No. 1 or 2 has an excellent ability for catching fungi such as viruses. For invention product No. 1 or 2, the average pore diameter is small, pressure loss is high in supplying water, and the amount of penetrating water is small per unit time.

Then, for compensation of pressure loss and water permeability, the outside filtering material 10B shown in FIG. 10—said another thing—does not include the super fine activated carbon powder. The outside filtering material 10B shown in FIG. 10 (said another thing) is composed by a coarse pore layer formed of the comparative product (shown in Table 1). For the comparative product, ability is not always excellent for catching fungus such as virus, pressure loss is lower in supplying water, and the amount of penetrating water is large per unit time. Therefore, the water purifier concerning embodiment 3 can increase the amount of penetrating water per unit time, while ensuring an ability for catching fungus such as virus.

The inside filtering material 10A—said one thing—in which the amount of penetrating water is small per unit time. The wall thickness of the inside filtering material 10A is shown as "ta". The outside filtering material 10B—said another thing—in which the amount of penetrating water is large per unit time. The wall thickness of the outside filtering material 10B is shown as "tb". Here, "ta" is smaller than "tb". This can ensures the amount of penetrating water per unit time in the water purifier.

According to the present embodiment, as shown in FIG. 10, water runs in the centripetal direction, the arrow direction of "W", from the outer circumferential surface of filtering material 1 to the center area thereof. So, firstly, the water penetrates the filtering material 10B whose average pore diameter is relatively large and whose water permeability is relatively large per unit time. Secondly, water penetrates the filtering material 10A whose average pore diameter is relatively small and whose water permeability is relative small per unit time.

Incidentally, according to the test for penetrating "brevundimonas", a substitutional fungi for polio viruses, at the case of a water pressure of 4.2 kgf/cm2, a sufficient catching ability requires that the wall thickness of the fine pore layer is at least 15 mm. The test result shows that the thickness up to 25 mm in the fine pore layer correlates closely with the amount of penetrating water. Further, the wall thickness over 25 mm of the fine pore layer hardly correlates with the amount of penetrating water in a viewpoint of the relationship between wall-thickness and water permeability.

Also, embodiments 1–3 can allow the operations of: (1) individually cutting a fine pore layer and a coarse pore layer to be a different size; and (2) combining with each other in a unit to form the filtering material 1. Further, embodiments 1–3 can allow the operations of: (1) preparing one starting material for forming the fine pore layer and another starting material for forming the coarse pore layer; (2) inserting said one and another of starting materials separately into a pressing die-cavity; (3) pressing the stating materials to integrally form the filtering material 1. This method is advantageous in production. Such case permits a different compounding rate between the one starting material for forming the fine pore layer and the another starting material for forming the coarse pore layer. This may generate differences in a drying contraction quantity, and a sintering contraction quantity between the fine pore layer and the coarse pore layer. So, this may require a consideration for preventing cracks.

Embodiment 4

Figure 11:
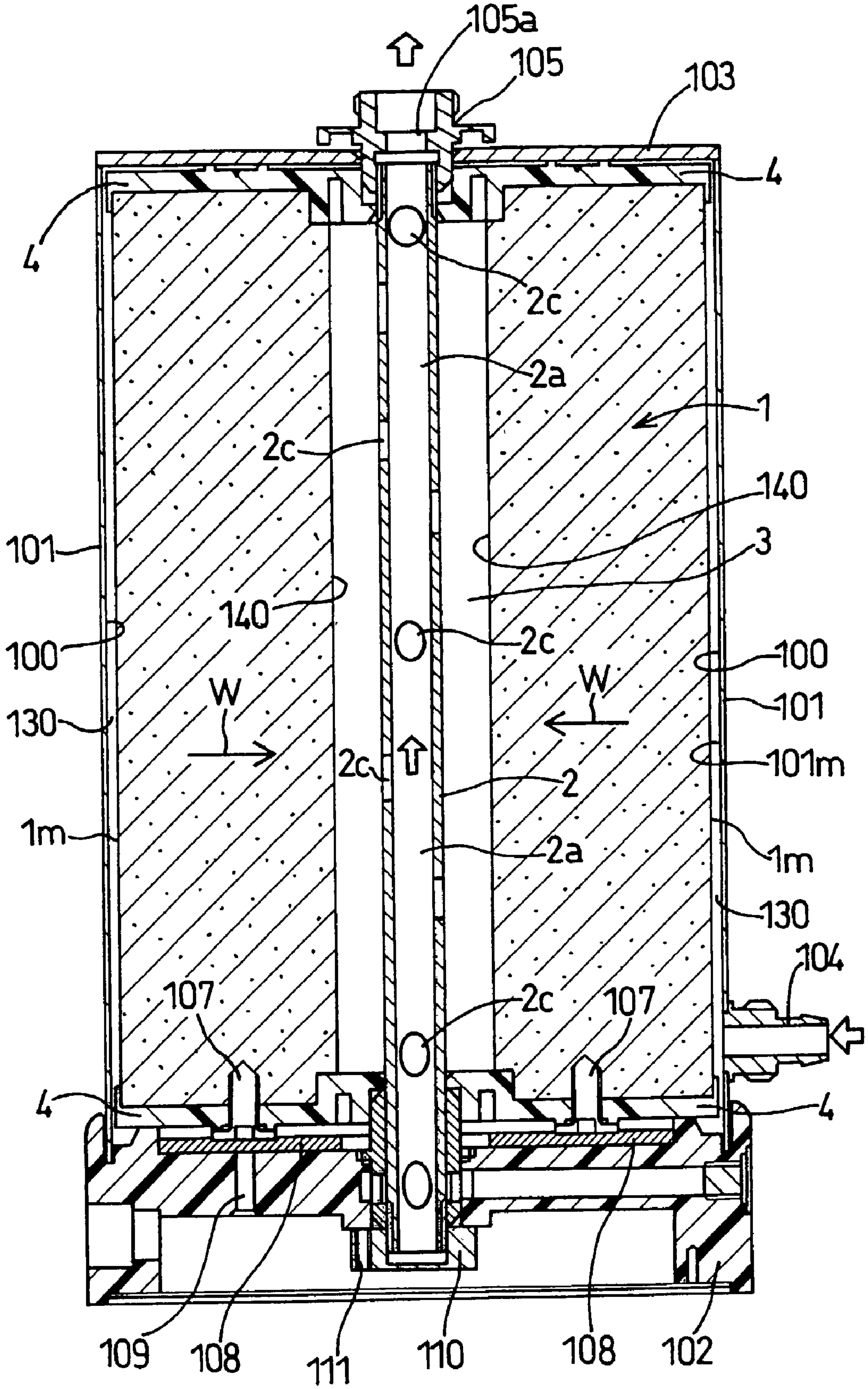
FIG. 11 is a sectional view of a water purifier concerning embodiment 4 having a filtering material formed of the invention product.

FIG. 11 shows a sectional view of a water purifier concerning embodiment 4 having a filtering material 1. The water purifier concerning embodiment 4 is fundamentally identical with that of embodiment 1 in structure and effect. The common portion is referred to the common code. As shown in FIG. 11, the filtering material 1 mounted on the water purifier includes a cylindrical shape. The filtering material 1 is composed of a fine pore layer formed by a block filter of invention product No. 1 or 2 including the super fine activated carbon powder, the base activated carbon powder, and the ceramic binder. The ceramic binder is alumina-silica system (alumina: 40–70 weight %, silica: 30–60 weight %) having a diameter of 150 $\mu$m or less. That is to say, when the ceramic binder is set to be 100 weight %, 80 weight % of the ceramic binder is the super fine particle having a diameter of about 5 $\mu$m or less. Invention product No. 1 or 2 has an excellent ability for catching fungi such as viruses.

Embodiment 5

Figure 12:
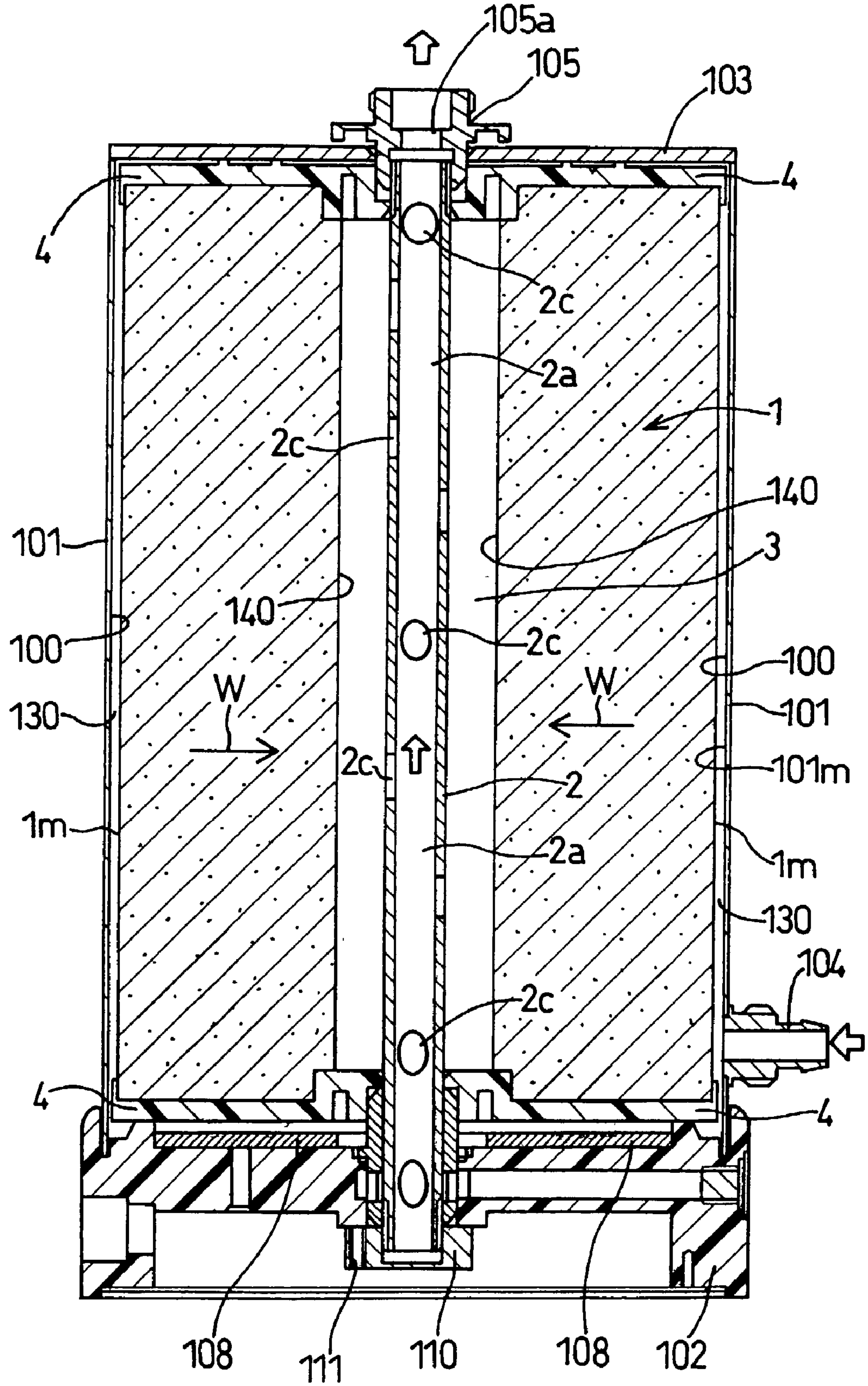
FIG. 12 is a sectional view of a water purifier concerning embodiment 5 having a filtering material formed of the invention product.

FIG. 12 shows a sectional view of a water purifier concerning embodiment 5 having a filtering material 1. The water purifier concerning embodiment 5 is fundamentally identical with that of embodiment 2 in structure and effect, not including an electrode. The common portion is referred to the common code. As shown in FIG. 12, the filtering material 1 mounted on the water purifier includes a cylindrical shape. The filtering material 1 is composed of a fine pore layer formed by a block filter of invention product No. 1 or 2 including the super fine activated carbon powder, the base activated carbon powder, and the ceramic binder. The ceramic binder is alumina-silica system (alumina: 40–70 weight %, silica: 30–60 weight %) having a diameter of 150 $\mu$m or less. That is to say, when the ceramic binder is set to be 100 weight %, 80 weight % of the ceramic binder is the super fine particle having a diameter of about 5 $\mu$m or less. Invention product No. 1 or 2 has an excellent ability for catching fungi such as viruses.

Additional Remarks

In embodiment 1, the outside filtering material 10B—said one thing whose average pore diameter is relatively small—is composed by a block filter of invention product No. 1 or 2 including the super fine activated carbon powder to exhibit a small diameter pore. The outside filtering material 10A—said another thing whose average pore diameter is relatively larger—is composed by a block filter of the comparative product not including the super fine activated carbon powder to exhibit a coarse diameter pore.

However, the outside filtering material 10B exhibiting a small diameter pore can be composed by a block filter of invention product No. 3 or 4 including the super fine activated carbon powder and the ceramic binder. In this case, the inside filtering material exhibiting a large diameter pore is composed by a block filter of the comparative product not including the super fine activated carbon powder.

Also, embodiments 1–3 uses the ceramic binder as a binder for forming the block filter; further, they may sometimes use resin binder. Embodiments 1–3 uses the filtering material having a two-layer structure; further, they may sometimes use a filtering material having a three-layer structure. The size of the filtering material 1 is not limited within the above mentioned range.

Having now fully described the present invention, it will be apparent to one of the ordinary skill in the art that many changes and modifications can be made thereto without departing from the split of scope of the present invention as set forth herein including the appended claims.

What is claimed is:

1. A water purifier configured to purify water for cooking or drinking, the water purifier comprising:

a hollow container; and a filtering material disposed inside the hollow container, said filtering material being formed of a sintered activated carbon block having a plurality of pores wherein said filtering material comprises a first filtering element having a cylindrical shape and a second filtering element having a cylindrical shape, said first filtering element is formed of a sintered activated carbon block filter having a plurality of pores, said second filtering element is formed of a sintered activated block filter having a plurality of pores, said first filtering element and said second filtering element are disposed coaxially, and said sintered activated carbon block filter is formed by combining an activated carbon powder with a ceramic binder.

2. The water purifier according to claim 1, wherein an average particle diameter of said ceramic binder is 150 $\mu$m or less.

3. The water purifier according to claim 1, wherein a method to produce said sintered activated carbon block filter comprises:

preparing a starting material by mixing a carbon mixture and a ceramic binder, said carbon mixture including a base activated carbon powder and a super fine activated carbon powder, the average diameter of particles in the super fine carbon powder being smaller than an average diameter of particles of said base activated carbon powder;

forming a body by pressing the starting material; and sintering the body to form a porous sintered activated block filter.

4. The water purifier according to claim 1, wherein an average pore diameter of the sintered activated carbon block filter of the first filtering element is smaller than an average pore diameter of the sintered activated carbon block filter of the second filtering element, and an amount of water per unit time penetrating through the first filtering element is smaller than an amount of water per unit time penetrating through the second filtering element.

5. The water purifier according to claim 4, wherein at least one of the first filtering element or the second filtering element is formed by combining an activated carbon powder with a ceramic binder, and an average particle diameter of said ceramic binder is 150 $\mu$m or less.

6. The water purifier according to claim 4, wherein the average pore diameter in the first filtering element is 0.1–0.5 $\mu$m, and the average pore in the second filtering element diameter is 0.5–3.0 $\mu$m.

7. The water purifier according to claim 4, wherein a pore particle size distribution of the first filtering element peaks around 10 $\mu$m or less, 40% by volume or more of the pores have a diameter of below 5 $\mu$m, and less than 30% by volume of the pores have a diameter greater than 8 $\mu$m.

8. The water purifier according to claim 4, wherein said water purifier has a water supplying portion for supplying water to said container, and a water discharging portion for discharging said water purified by said filtering material inside said container.

9. The water purifier according to claim 8, wherein said container has a circumferential portion, said water discharging portion is disposed at said circumferential portion of said container.

10. The water purifier according to claim 4, wherein after water penetrates said second filtering element, said water penetrates said first filtering element.

11. The water purifier according to claim 4, wherein after water penetrates said first filtering material, said water penetrates said second filtering material.

12. The water purifier according to claim 4, wherein said filtering material has a cylindrical shape having an outer circumferential surface and a central portion, said container has an inner circumferential surface, and a clearance having a ring shape is formed between said outer circumferential surface of said filtering material and said inner circumferential surface of said container; and wherein water penetrates said filtering material from said outer circumferential surface of said filtering material to said central portion of said filtering material.

13. The water purifier according to claim 4, wherein said first filtering element and said second filtering element are integrally disposed in a unit.

14. The water purifier according to claim 4, wherein each of said first filtering element inner layer and said second filtering element outer layer has an axial end surface covered with a cap for preventing water from flowing there from; and said water penetrates said first filtering element and said second filtering element in a radial direction.

15. The water purifier according to claim 4, wherein said second filtering element is disposed at an outer circumferential side of said filtering material, and said first filtering element is disposed at an inner circumferential side of said filtering material.

16. The water purifier according to claim 4, wherein said second filtering element is disposed at an inner circumferential side of said filtering material, and said first filtering element is disposed at an outer circumferential side of said filtering material.

17. The water purifier according to claim 4, wherein a method to produce said sintered activated carbon block filter comprises:

preparing a starting material by mixing a carbon mixture and a ceramic binder, said carbon mixture including a base activated carbon powder and a super fine activated carbon powder, the average diameter of particles in the super fine carbon powder being smaller than an average diameter of particles of said base activated carbon powder;

forming a body by pressing the starting material; and sintering the body to form a porous sintered activated block filter.

18. The water purifier according to claim 4, wherein a method to produce said second filtering element compnses:

preparing a starting material by mixing a carbon mixture and a ceramic binder, said carbon mixture including a base activated carbon powder and a super fine activated carbon powder, the average diameter of particles in the super fine carbon powder being smaller than an average diameter of particles of said base activated carbon powder;

forming a body by pressing the starting material; and sintering the body to form a porous sintered activated block filter.

19. The water purifier according to claim 17, wherein said base activated carbon powder has an average diameter between 35 μm and 200 μm, and the super fine activated carbon powder has an average diameter of 30 μm or less.

20. The water purifier according to claim 4, wherein said sintered activated carbon block filter is formed by combining an activated carbon powder with a binder, said binder is composed of a ceramic binder, and an average diameter of said ceramic binder is 150 μm or less.

21. The water purifier according to claim 20, wherein said ceramic binder comprises alumina, silica, or a combination of alumina and silica.

22. The water purifier according to claim 20, wherein 30% by weight of particles of ceramic binder have a diameter of 5 μm or less.

23. The water purifier according to claim 20, wherein 40% by weight of particles of ceramic binder have a diameter of 5 μm or less.

24. The water purifier according to claim 20, wherein an amount of said ceramic binder in said activated carbon block filter is 50% by weight or less, and an amount of said activated carbon powder is 50% by weight or more.

25. The water purifier according to claim 4, wherein said filtering material has a cylindrical shape, and said water purifier has an electrode for applying a voltage to said filtering material in a radial direction of said filtering material.

26. The water purifier according to claim 4, further comprising:

a first one electrode selected from a positive electrode and a negative electrode attached to said filtering material;

a first electrode terminal electrically connected with said first electrode;

a second electrode selected from a positive electrode and negative electrode attached to said container side; and a second electrode terminal electrically connected with said another electrode.

27. The water purifier according to claim 26, wherein a voltage between 1 and 10 volts is applied between said first electrode terminal and said second electrode terminal.

28. The water purifier according to claim 8, wherein said filtering material has a hole formed vertically, and a cylindrical member is disposed inside said hole in communication with at least one of said water supplying portion and said water discharging portion.

29. The water purifier according to claim 28, wherein said container has a cylindrical shape having an upper opening, said upper opening is covered with a lid for electrically connecting the outer circumferential portion of said container with said cylindrical member, and said container and said cylindrical member are set in a common pole.

30. The water purifier according to claim 28, wherein said cylindrical member has a passage in communication with said water discharging portion and a plurality of openings at a circumferrencial circumferential wall of said cylindrical member, and the water purified by said filtering material flows through said passage from said plurality of openings to said water discharging portion.

31. A water purifier, comprising:

a hollow container; and a filtering material disposed inside the hollow container, said filtering material being configured to purify water supplied to said container, wherein said filtering material is formed of an outer layer of a porous sintered activated carbon block filter and an inner layer of a porous sintered activated carbon block filter, and a porosity of said outer layer is finer than a porosity of said inner layer.

32. A water purifier, comprising:

a hollow container; and a filtering material disposed inside the hollow container, said filtering material being configured to purify water supplied to said container, wherein said filtering material is formed of an outer layer of a porous sintered activated carbon block filter and an inner layer of a porous sintered activated carbon block filter, and a porosity of said inner layer is finer than a porosity of said outer layer.

33. The water purifier according to claim 32, wherein a thickness of said inner layer is smaller than a thickness of said outer layer.

* * * * *

UNITED STATES PATENT AND TRADEMARK OFFICE

CERTIFICATE OF CORRECTION

PATENT NO. : 6,986,843 B2 Page 1 of 1
APPLICATION NO. : 10/208998
DATED : January 17, 2006
INVENTOR(S) : Shigeo Tochikubo et al.

It is certified that error appears in the above-identified patent and that said Letters Patent is hereby corrected as shown below:

Column 16, line 33, change “electrode terminal). electrically” to --electrode terminal) electrically--.

Column 24, line 40, change “a circumferrencial circumferential” to --a circumferential--.

Signed and Sealed this

Twenty-eighth Day of November, 2006

JON W. DUDAS
*Director of the United States Patent and Trademark Office*